UNITED STATES PATENT OFFICE.

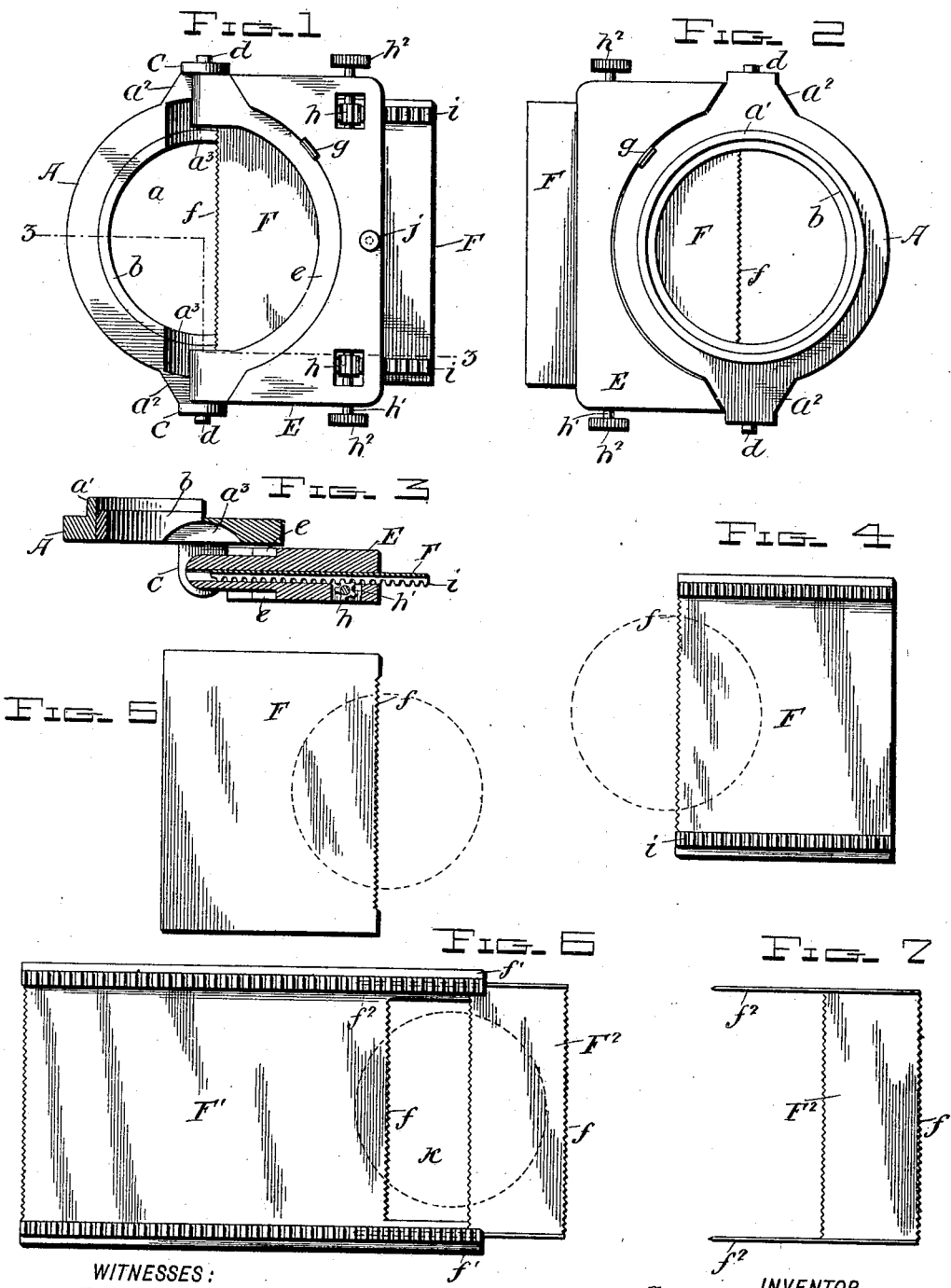

CARL FRANK HUG, OF THE UNITED STATES NAVY.

PHOTOGRAPHIC-CAMERA ATTACHMENT.

SPECIFICATION forming part of Letters Patent No. 678,490, dated July 16, 1901.

Application filed April 5, 1901. Serial No. 54,565. (No model.)

*To all whom it may concern:*

Be it known that I, CARL FRANK HUG, United States Navy, a citizen of the United States, residing on board the United States steamship *Philadelphia*, have invented certain new and useful Improvements in Photographic-Camera Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to attachments for photographic cameras, and has for its object the provision of improved means by the operation of which a plurality of exposures may be successively made on a single sensitive plate to produce a multiple or a trick picture.

The nature of my invention will be readily comprehended, reference being had to the following detailed description and to the accompanying drawings, in which—

Figure 1 is a front elevation of a photographic-camera attachment embodying my invention. Fig. 2 is a rear elevation of the same. Fig. 3 is a sectional view on line 3 3 of Fig. 1. Figs. 4 and 5 are detail views of the slide adjusted to divide the plate for two exposures. Fig. 6 is a view of a slide adapted to divide the plate for three or more exposures. Fig. 7 is a detail view of the auxiliary slide forming a part of the slide shown in Fig. 6.

Referring to the drawings by letter, A denotes a frame of substantially circular form having a central opening $a$, around which is a flange $a'$. In the opening is a bushing $b$, which in practice closely fits the lens-tube. It will be understood that to adapt the attachment to different-sized tubes a number of bushings of different diameters are provided. At opposite points the frame is provided with extensions $a^2 a^2$, from which project brackets $c c$. At $a^3 a^3$ the frame, as well as the bushing, is cut away, the depressions or recesses being preferably of semicircular form in cross-section. Pivoted to the brackets $c$ by means of pins $d\ d$ is a wing E, carrying an adjustable slide F. The pivotal line of the wing is central of the opening $a$, and consequently of the lens, and in operation the wing is swung from side to side to effect through the slide F successive exposures of divisions of the plate. The wing, at its inner side, is cut away to conform to the opening $a$, whereby upon the withdrawal of the slide an exposure of the entire plate is obtained. At each side of the wing, beyond the cut-away portion or opening, is a depression or recess $e$, which receives the outer side of the frame A, and spring-clips $g\ g$ are provided on the wing to engage the outer sides of the frame to hold the wing in position. The slide F occupies a slot in the wing and is moved therein by the engagement of rotatable pinions $h\ h$ with rack-bars $i\ i$, carried by the slide. The pinions are fixed to a rod $h'$, journaled in bearings on the wing, and at one or both ends of the rod is a milled wheel $h^2$, by which the rod and pinions are rotated. $j$ denotes a set-screw which when tightened holds the slide in its adjusted position.

In the operation of the attachment only one adjustment of the slide is necessary where the plate is to be equally divided, although such adjustment will vary according to the size of the diaphragm-opening. For example, with a small opening the slide is moved to cover nearly one-half of the lens, whereas if a large opening is used the slide is adjusted to proportionately diminish the exposed area. Such adjustment I have found by experience to be necessary, and I have further demonstrated that in order to obviate the formation of a visible line between the pictures the slide must be adjusted to extend short of the dividing-line of the plate. In Figs. 4 and 5 the slide is shown adjusted to expose slightly more than one-half of the plate, this adjustment serving for both exposures. When the division of the plate is unequal—say in the proportion of one-third and two-thirds—the slide is adjusted to expose a little more than two-thirds of the plate, and when the wing is swung to the opposite side the slide is adjusted to expose a little more than one-third. By thus positioning the slide the images will slightly overlap without the formation of even a very faint joining-line. To further insure against the formation of a visible line, the outer edge of the slide is provided with serrations $ff$, which serve to blend the edges of the pictures or parts of a picture.

In practicing my invention the element of chance is entirely eliminated. The camera with the attachment in place is properly positioned and the image on the ground glass examined, and by moving the wing from side to side and manipulating the slide the latter is properly adjusted to secure, as above stated, a slight overlapping of the pictures or parts of a picture.

One of the advantages of my attachment is that of wide range of adjustment, the construction permitting the positioning of the attachment vertically, horizontally, or at an inclination. By such adjustments very curious and grotesque results are obtainable without necessary exercise of special skill.

In Figs. 6 and 7 is shown a slide by which triple, quadruple, &c., exposures may be made. The slide, which is lettered F', is provided with extensions $f' f'$, in which longitudinally are sockets slidably receiving rods $f^2 f^2$ on an auxiliary slide $F^2$. The auxiliary slide $F^2$ is movable in the slide F' to provide an opening $k$, through which the plate is exposed, the width of the opening varying according to the number of exposures desired. For example, for three, four, five, or more pictures on one plate the opening $k$ will be set to one-third, one-fourth, one-fifth, &c., of the diameter of the lens. The slide may be employed for a double exposure, similarly to the slide F, by moving the auxiliary slide to entirely close the opening $k$. The edges of the slides F' and $F^2$ are provided with serrations $f$. The different adjustments of the lenses F' and $F^2$ are made by observing the image on the ground glass. The slide is capable of adjustment to bring its outer serrated edge beyond the pivotal line of the frame to compensate for variations in the size of the diaphragm-openings. Such adjustment, however, in no way interferes with the swinging of the frame, as the depressions or recesses $a^3$ are of sufficient depth to allow free movement of the slide in any of its adjustments.

I claim as my invention—

1. In a multiplying attachment for cameras, the combination of a pivoted wing and an adjustable slide carried by the wing.

2. In a multiplying attachment for cameras the combination of a frame adapted to be secured to the lens-tube, a wing pivoted to the frame to swing from side to side, and an adjustable slide carried by the wing.

3. In a multiplying attachment for cameras the combination of a frame adapted to be adjustably secured to the lens-tube, a wing pivoted centrally to the frame, and an adjustable slide carried by the wing.

4. In a multiplying attachment for cameras the combination of a frame adapted to be secured to the lens-tube, a slotted wing pivoted to the frame to swing from side to side, a slide movable in the slot of the wing, and means for moving the slide.

5. In a multiplying attachment for cameras the combination of a frame adapted to be secured to the lens-tube, a slotted wing pivoted to the frame to swing from side to side, a slide movable in the slot, rack-and-pinion means for moving the slide, and a set-screw for maintaining the adjustment of the slide.

6. In a multiplying attachment for cameras, the combination of a pivoted wing and an adjustable slide carried by the wing, said slide having serrations along its field-dividing edge.

7. In a multiplying attachment for cameras, the combination of a pivoted wing and an adjustable slide carried by the wing, said slide having a serrated opening.

8. In a multiplying attachment for cameras, the combination of a movable slide, and an auxiliary slide movably attached to the aforesaid slide and providing an adjustable field-dividing opening.

In testimony whereof I affix my signature in presence of two witnesses.

CARL FRANK HUG.

Witnesses:
W. H. SCHULTZ,
E. H. DE LANY.